United States Patent [19]

Molnár et al.

[11] Patent Number: 4,732,676

[45] Date of Patent: Mar. 22, 1988

[54] FILTER DEVICE CONTAINING SERIES-CONNECTED FIBROUS TUBE ELEMENTS

[75] Inventors: Otto Molnár, Strand; Johan P. Barnard, Wellington, both of South Africa

[73] Assignee: Bakke Industries, Paarl, South Africa

[21] Appl. No.: 802,619

[22] Filed: Nov. 27, 1985

Related U.S. Application Data

[63] Continuation of Ser. No. 535,868, Sep. 26, 1983, abandoned, which is a continuation of Ser. No. 281,177, Jul. 6, 1981, abandoned.

[51] Int. Cl.$^4$ ............................................. B01D 13/00
[52] U.S. Cl. ....................... 210/321.73; 210/336; 210/339; 210/433.2; 210/323.2
[58] Field of Search .......... 210/247, 315, 321.1–321.5, 210/323.2, 335, 337, 339, 342, 433.1, 433.2, 451, 455, 456, 489, 492, 498, 336; 55/158; 422/48; 535/868

[56] References Cited

U.S. PATENT DOCUMENTS

| | | | |
|---|---|---|---|
| 3,494,470 | 2/1970 | Banfield | 210/321.1 |
| 3,707,234 | 12/1972 | Salemi | 210/321.1 |
| 3,746,591 | 7/1973 | Banfield | 210/321.1 |
| 3,774,771 | 11/1973 | Manjikian et al. | 210/456 |
| 4,016,078 | 4/1977 | Clark | 210/94 |
| 4,125,468 | 11/1978 | Joh et al. | 210/456 |
| 4,220,535 | 9/1980 | Leonard | 55/158 |
| 4,326,960 | 4/1982 | Iwahori et al. | 210/433.2 |

*Primary Examiner*—David Sadowski
*Attorney, Agent, or Firm*—Pearne, Gordon, McCoy & Granger

[57] ABSTRACT

A liquid filter device has a housing and a multiple of closely spaced discs provided in the housing, the discs having holes which are adapted to be in alignment so as to define at least one elongated passage. The discs have separating means separating the discs from each other so as to provide a flow gap between adjacent discs. A filter tube is provided in each elongated passage. A fluid inlet leads into the housing to provide fluid into the interior of at least one filter tube, and a fluid outlet leads from the housing to withdraw fluid, which has passed through the filter tubes and into the flow gap between the discs. Interconnection means interconnect the ends of the filter tubes, and a resin casting surrounds the interconnection means.

5 Claims, 6 Drawing Figures

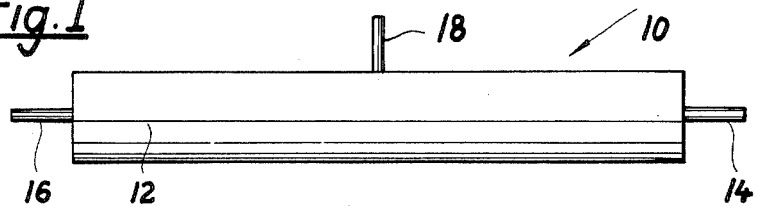
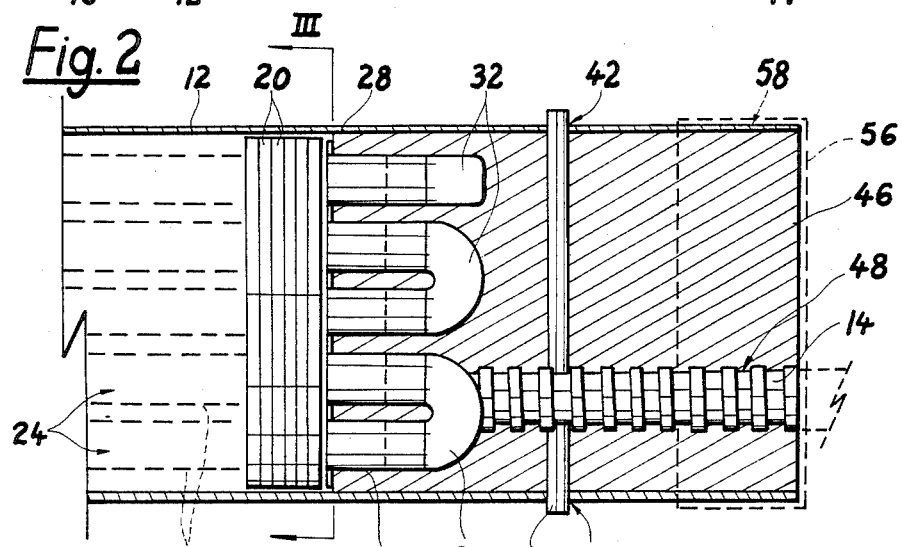
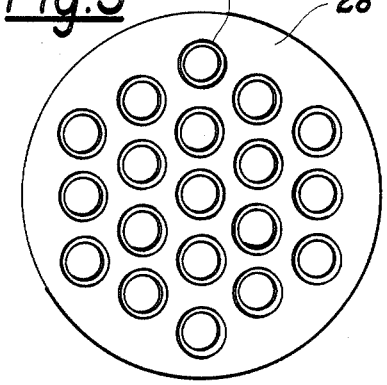
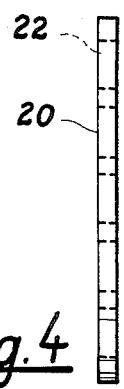
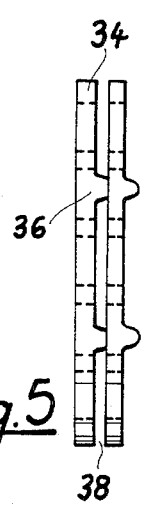
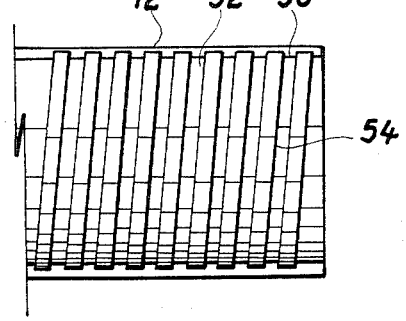

FILTER DEVICE CONTAINING SERIES-CONNECTED FIBROUS TUBE ELEMENTS

This is a continuation of application Ser. No. 535,868, filed on Sept. 26, 1983, now abandoned, which is a continuation of application Ser. No. 281,177, filed on July 6, 1981, now abandoned.

The present invention relates to liquid filter devices.

BACKGROUND TO INVENTION

The invention relates to liquid filter devices having a number of filter tubes or membranes, which are provided in a housing and which are interconnected. The liquid medium to be filtered is supplied from one end of the filter device into one tube (or by way of a manifold into a number of tubes) and passes along the tubes to be filtered through the walls of the filter tubes. The filtered liquid then is withdrawn from the space in the housing surrounding the filter tubes. The liquid, which remains, passes out through a discharge outlet. The filter walls of the tubes normally are made of fibrous material, which is relatively weak. The filter walls generally are supported either in outer support tubes made of stiff material (e.g. metal) having holes for the filtered liquid to pass through or the filter tubes are supported in side-by-side stacked discs with aligned holes for the tubes, the discs having gaps through which the filtered liquid passes.

The assembly of the filter devices always has been cumbersome and expensive, in particular regarding the provision of interconnecting tubes at the end of the filter tubes to join them into a continuous flow channel. A major problem in this regard was the proper sealing off of the ends of the filter tubes to the interconnecting tubes.

It is an object of the invention to provide a liquid filter device in which the problem of the prior art is overcome.

THE INVENTION

According to the invention, a liquid filter device includes (a) an elongated tubular housing;

(b) a stack of discs provided in the housing, the discs having holes which are in alignment so as to define a number of elongated passages;

(c) separating means separating the discs from each other so as to provide a flow gap between adjacent discs;

(d) an end disc provided at each end in the housing, each end disc having holes which respectively are in alignment with the elongated passages of the stack of discs;

(e) a filter tube provided in each elongated passage and projecting at opposite ends through the end discs with its opposite open ends located beyond the end discs;

(f) a fluid inlet into the housing to feed fluid into the interior of at least one filter tube;

(g) a fluid outlet to withdraw fluid which has passed through the filter tubes and into the flow gap between the discs;

(h) flow interconnection means provided at either open end of each filter tube for connecting the open ends of filter tubes at one end of the tubular housing so as to allow flow to take place from the open end of one filter tube into the end of at least one other filter tube at the same end of the tubular housing;

(i) a resin casting provided in situ in the housing at each end of the housing and extending from such end disc to encapsulate both the interconnection means as well as the open ends of the filter tubes associated with the interconnection means to maintain the interconnection means in fluidtight relationship on the open ends on the filter tube and to close off the interconnection means fully in fluidtight relationship also relative to the stack of discs and the filter tubes in the tubular housing between the end discs; and (j) anchoring or locking means for firmly locking the resin castings relative to the housing.

The interconnection means may include a plate member having a number of holes through which the ends of filter tubes are adapted to protrude and a number of coupling tubes for interconnecting the ends of the filter tubes for providing the filter tubes in series thereby forming one continuous filter passage.

The housing may have an internal anchoring recess in the region in which the resin casting is provided, the resin casting extending into the recess. The recess may be a spiral groove or a number of spaced annular grooves.

An anchoring member may pass through the resin casting and be fixed to the housing for anchoring the resin casting to the housing.

Each end of the housing may be closed off by means of a closure cap, and a charging hole may be provided in the closure cap for charging flowable hardenable resin into the housing for forming the resin casting. The closure cap may be threaded so as to cooperate with a corresponding thread provided on the housing end.

The housing may be of cylindrical shape and the tubular filter elements may be located adjacent each other in the housing, with interconnection means being provided at both ends of the tubular elements.

The invention will now be described by way of example with reference to the accompanying schematic drawings.

BRIEF DESCRIPTION OF THE DRAWINGS

In the drawings there is shown in

FIG. 1 a schematic outside view of a liquid filter device in accordance with the invention;

FIG. 2 on a larger scale, a sectional side view of one end of the liquid filter device illustrated in FIG. 1;

FIG. 3 an end view on a plate member of the end connection member provided in the liquid filter device and as seen along arrows III—III in FIG. 2;

FIG. 4 a side view of a disc;

FIG. 5 a side view corresponding to FIG. 4 but showing another type of disc; and FIG. 6 a sectional side view of the end of a liquid filter device corresponding to FIG. 2 but showing an internally grooved housing.

DESCRIPTION OF THE PREFERRED EMBODIMENTS

In FIG. 1 of the drawings a schematic outside view of a liquid filter device in accordance with the invention is illustrated. As is shown, the device 10 includes a tubular cylinder housing 12, a number of liquid filter tubes (not shown) inside the housing, an inlet 14 for supplying liquid to be filtered to the filter tubes, a discharge 16 leading from the filter tubes for discharging liquid, which has passed through the tubes without filtration, and an outlet 18 for filter liquid which has been filtered through the filter tubes and collected from the space surrounding the tubes inside the housing 12.

Referring now to FIG. 2, the housing 12 is shown to be provided with a number of discs 20 arranged in side-by-side relationship inside the housing. These discs 20 have holes 22 and are arranged such that the holes 22 are in alignment to define elongated passages 24. The filter tubes or membranes 26 are provided in these passages. Adjacent to the last disc on either end, a plate member 28 is provided. The ends of the filter tubes 26 pass through the holes 30 of the plate member 28 (the holes 30 being surrounded by a short collar or guide). The plate member 28 fits fully into the tube 12 so as to close off the discs 20 from the end opening of the housing 12. The ends of the filter tubes 24 are interconnected by means of U-shaped interconnection pipe parts 32. These fit into the ends of the filter tubes 24 so as to provide the filter tubes 26 as one continuous filter passage.

It has been found that the discs 20, which may be made of punched out or injection molded plastic material, provide a sufficient space between the discs for the filtered liquid to pass through for collection and flow out through the outlet 16. However, to provide a larger space, the discs 20 may be provided with protrusions as is shown in FIG. 5. FIG. 5 shows discs 34 having protrusions 36 to space them from the adjacent discs for defining a gap 38 between the discs. Filtered liquid passes through this gap 38.

When the discs 20 (or 34) have been assembled and provided with the end plate member 28 and the U-tube connections 32, they are inserted into the tubular housing 12. The housing 12 has holes at opposite ends 42 for receiving a pin or shaft 44. With the pin 44 in position, a hardenable synthetic resin is poured into the space to form a casting 46. As is shown the casting 46 surrounds the pin 44, the pipe connectors 32, and extends up to the end plate 28. When hardened, there is no danger of any leakage occuring at the ends of the membrane filter tubes 26 receiving the connectors 32.

Also, as is shown, the inlet pipe 14 is provicded with a grooved outer surface 48 for the resin to grip into. The same applies to the outlet pipe 16.

As is shown in FIG. 6, the pin 44 may be replaced by grooves 50 provided on the inside surface 52 of the cylinder 12. The resin casting 54 then would fit into the grooves 50 to keep the assembly in position and to seal off the pipe connectors 32.

When a filter device is to be refitted with new membranes, the pin 44 is removed and the resin casting 46 at either end of the housing 12 is knocked out together with the discs 20, etc. Thereafter the resin castings 46 are cut off, the discs 20 are removed and are used again for fitting into a housing (it may be the same housing as before) to form a new liquid filter device 10. The device 10 can be subjected to backflow to clean it in the normal manner.

In place of the pin 44 (FIG. 2) or the grooved inside surface 52 of the cylinder 12 (FIG. 6), a cap shown in dotted lines 56 in FIG. 2 may be used for keeping the resin casting 46 in position. This cap 56 should have an internal thread cooperating with a corresponding thread on the cylinder end 58. The cap 56 thus is screwed onto the cylinder end and keeps the casting 46 in position. For removal the cap 56 is merely turned off and the casting 46 is removed.

The device 10 also may be used for high flux filtration, reverse osmosis or ultra-filtration purposes.

The filter tubes may be made of polyester fibre with hydrolised cellulose acetate on the inside.

We claim:
1. A liquid filter device which includes:
  (a) an elongated tubular housing;
  (b) a stack of discs provided in the housing, the discs having holes which are in alignment so as to define a plurality of elongated passages;
  (c) separating means separating the discs from each other so as to provide a flow gap between adjacent discs;
  (d) an end disc provided at each end in the housing, each end disc having holes which respectively are in alignment with the elongated passages of the stack of discs;
  (e) a filter tube provided in each elongated passage and projecting at opposite open ends through and beyond the end discs;
  (f) a fluid inlet into the housing to feed fluid into the interior of at least one filter tube;
  (g) a fluid outlet to withdraw fluid, which has passed through the filter tubes and into a flow gap between the discs;
  (h) U-shaped tubular members provided at both open ends of at least two said filter tubes for interconnecting open ends of filter tubes at both ends of the tubular housing so as to allow series flow to take place from the open end of one filter tube into the end of at least one other filter tube at said ends of the tubular housing via said U-shaped tubular members;
  (i) a resin casting provided in situ in the housing at each end of the housing and extending from the respective end disc to encapsulate and seal both the U-shaped tubular members and the exposed surfaces of the ends of the filter tubes extending beyond the end disc and associated with the U-shaped tubular members so as to maintain the U-shaped tubular members in fluid-tight relationship with the interconnected ends of the filter tubes, and so as to seal the U-shaped tubular members in fluidtight relationship relative to the stack of discs and the filter tubes in the tubular housing between the end discs; and
  (j) locking means for firmly locking the resin castings in place relative to the housing.
2. A device as claimed in claim 1, wherein said locking means includes internal grooves defined by said housing into which the resin castings fit.
3. A device as claimed in claim 1, wherein said locking means extends through the resin castings and is attached to the housing for anchoring the resin castings to the housing.
4. A device as claimed in claim 1, wherein said locking means includes each housing end being threaded and a correspondingly threaded cap provided on each end of the housing for keeping the resin castings in position.
5. A device as claimed in claim 1, in which said separating means comprises each disc defining protrusions out of its general plane for separating the discs from each other.

* * * * *